(12) United States Patent
Kobayashi (10) Patent No.: US 12,222,328 B2
(45) Date of Patent: Feb. 11, 2025

(54) TESTING APPARATUS AND TESTING METHOD

(71) Applicant: DISCO CORPORATION, Tokyo (JP)

(72) Inventor: Makoto Kobayashi, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 307 days.

(21) Appl. No.: 17/808,626

(22) Filed: Jun. 24, 2022

(65) Prior Publication Data

US 2023/0010092 A1  Jan. 12, 2023

(30) Foreign Application Priority Data

Jul. 9, 2021  (JP) .................................. 2021-114179

(51) Int. Cl.
*G01N 3/08* (2006.01)
*G01N 3/06* (2006.01)

(52) U.S. Cl.
CPC .................. *G01N 3/08* (2013.01); *G01N 3/06* (2013.01); *G01N 2203/0019* (2013.01); *G01N 2203/0078* (2013.01)

(58) Field of Classification Search
CPC ....... G01N 3/08–18; G01N 2203/0019; G01N 2203/02; G01N 2203/0202; G01N 2203/0204; G01N 2203/0208
See application file for complete search history.

(56) References Cited

U.S. PATENT DOCUMENTS

| | | | | |
|---|---|---|---|---|
| 5,594,178 A | * | 1/1997 | Takahashi | G01N 3/32 |
| | | | | 73/813 |
| 7,364,103 B2 | * | 4/2008 | Kraemer | G01N 3/04 |
| | | | | 73/818 |
| 9,291,538 B2 | * | 3/2016 | Sawa | G01N 3/42 |
| 2020/0182923 A1 | * | 6/2020 | Kobayashi | H01L 21/67253 |

FOREIGN PATENT DOCUMENTS

| | | |
|---|---|---|
| JP | 2020094833 A | 6/2020 |
| RU | 2698738 C1 * | 8/2019 |

* cited by examiner

*Primary Examiner* — Justin N Olamit
(74) *Attorney, Agent, or Firm* — GREER BURNS & CRAIN, LTD.

(57) ABSTRACT

A testing apparatus includes a support unit that supports a lower surface side of a test piece, a pressing unit having an indenter that presses the test piece supported by the support unit, a drive unit that raises and lowers the pressing unit, a load measurement instrument that measures a load generated when the indenter presses the test piece supported by the support unit, and a controller that controls raising and lowering of the pressing unit. The controller is configured to be capable of stopping movement of the indenter when a measurement value of the load measurement instrument has turned from a rise to a fall after the indenter has started pressing of the test piece.

7 Claims, 9 Drawing Sheets

TESTING APPARATUS AND TESTING METHOD

BACKGROUND OF THE INVENTION

Field of the Invention

The present invention relates to a testing apparatus and a testing method that break a test piece and measure the strength thereof.

Description of the Related Art

As a related art, an apparatus for measuring the flexural strength of a semiconductor device chip is known as disclosed in Japanese Patent Laid-open No. 2020-94833, for example. In Japanese Patent Laid-open No. 2020-94833, disclosed is a testing apparatus that enables measurement of the flexural strength easily and with high accuracy by employing a configuration in which a chip is picked up from a wafer after dicing and the measurement of the flexural strength is automatically executed.

In this kind of testing apparatus, in general, a three-point bending test specified in Semiconductor Equipment and Materials International (SEMI) standard G86-0303 is executed. Specifically, the testing apparatus includes a load cell as a load measurement instrument, and the flexural strength of a test piece is calculated based on a load measurement value when the test piece is pressed by an indenter and is broken.

SUMMARY OF THE INVENTION

The testing apparatus with a configuration disclosed in Japanese Patent Laid-open No. 2020-94833 presses a test piece by an indenter and breaks the test piece. Therefore, this testing apparatus is configured to move the indenter until the indenter reaches the lower side of the test piece supported by a support unit from the upper side of the test piece. Furthermore, the movement distance of the indenter is set to have a sufficient margin in order to surely break the test piece.

However, a lowering speed of the indenter when the test piece is broken is equal to or lower than 5 mm/min specified in the above-described SEMI standard or lower. Therefore, when the movement distance of the indenter is made to have the sufficient margin, there is a problem that a long time is taken until the measurement is completed.

On the other hand, there is also a fear that the test piece is not surely broken when the movement distance of the indenter is insufficient.

Thus, an object of the present invention is to provide a novel testing apparatus that allows shortening of the measurement time and allows avoidance of a trouble that a test piece is not broken due to insufficiency of the movement distance of an indenter.

In accordance with an aspect of the present invention, there is provided a testing apparatus including a support unit that supports a lower surface side of a test piece, a pressing unit having an indenter that presses the test piece supported by the support unit, a drive mechanism that raises and lowers the pressing unit, a load measurement instrument that measures a load generated when the indenter presses the test piece supported by the support unit, and a controller that controls raising and lowering of the pressing unit, in which the controller is configured to be capable of stopping movement of the indenter when a measurement value of the load measurement instrument has turned from a rise to a fall after the indenter has started pressing of the test piece.

It is preferable that the controller store a program that executes, based on selection by an operator, either one of first control to stop the movement of the indenter when the measurement value of the load measurement instrument has turned from a rise to a fall after the indenter has started the pressing of the test piece, and second control to stop the movement of the indenter when the measurement value of the load measurement instrument has become zero after the indenter has started the pressing of the test piece.

In accordance with another aspect of the present invention, there is provided a testing method including a support step of supporting a lower surface side of a test piece by a support unit, a pressing step of pressing the test piece supported by the support unit with an indenter, a measurement step of measuring a load of pressing by the indenter with a load measurement instrument in conjunction with start of the pressing step, and a first stop step of stopping movement of the indenter when a measurement value of the load measurement instrument has turned from a rise to a fall in the measurement step.

The testing method may include, instead of the first stop step, a second stop step of stopping the movement of the indenter when the measurement value of the load measurement instrument has become zero through continuing the movement of the indenter also after the measurement value of the load measurement instrument has turned from a rise to a fall in the measurement step.

According to the respective aspects of the present invention, it is deemed that breakage has occurred in the test piece and movement of the indenter can be stopped when the measurement value of the load measurement instrument has turned from a rise to a fall in the movement of the indenter. This can minimize the movement of the indenter and shorten the measurement time. Moreover, by moving the indenter until the measurement value of the load measurement instrument turns from a rise to a fall, the possibility that it is impossible to break the test piece due to insufficiency of the movement of the indenter can be prevented.

Further, in the respective aspects of the present invention, by executing the second control instead of the first control, storing the behavior until the test piece is completely divided and the load becomes zero is enabled. Furthermore, also when the second control is executed, the measurement can be ended halfway without moving the indenter across a distance made to have a sufficient margin in order to surely break the test piece. Therefore, shortening of the measurement time is intended.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
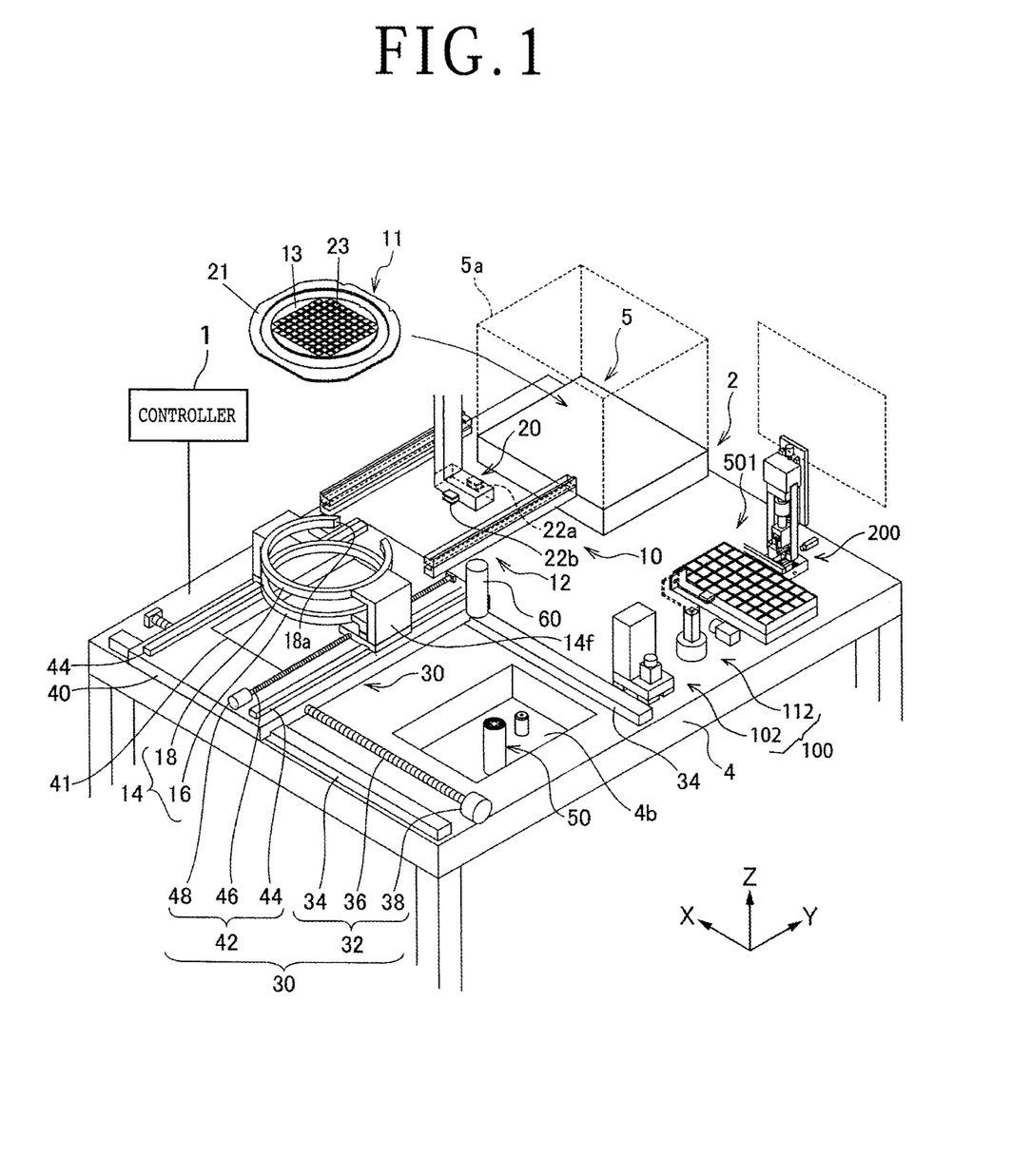
FIG. 1 is a diagram illustrating a configuration of a pick-up apparatus including a testing apparatus according to an embodiment of the present invention.
Figure 2:
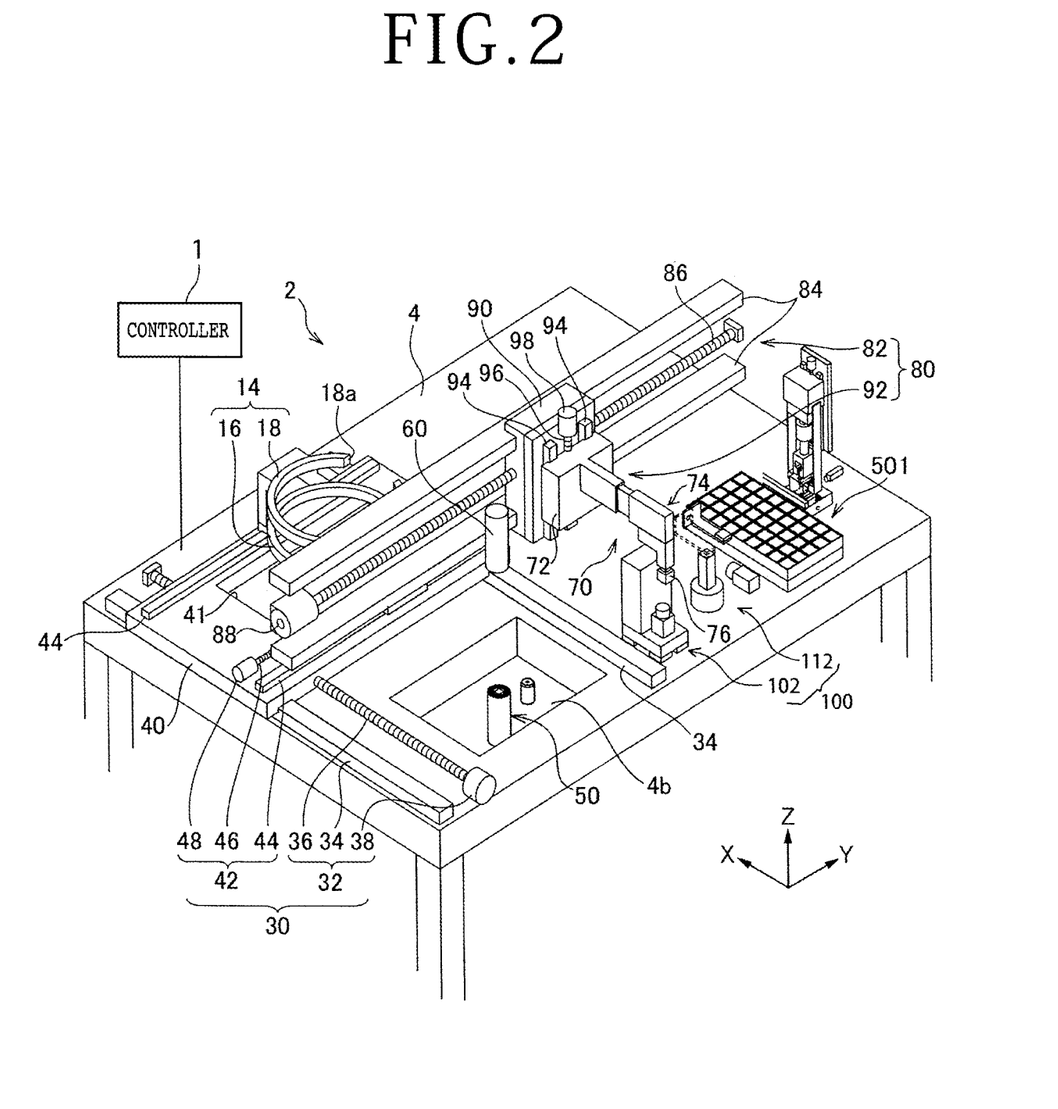
FIG. 2 is a diagram illustrating the configuration of the pick-up apparatus including the testing apparatus according to the embodiment of the present invention.

An embodiment of the present invention will be described below with reference to the drawings. FIG. 1 and FIG. 2 are diagrams illustrating a configuration of a pick-up apparatus 2 including a testing apparatus 200 according to the embodiment of the present invention. The testing apparatus 200 may be what is configured by the testing apparatus 200 solely besides being annexed to the pick-up apparatus 2.

As illustrated in FIG. 1, the pick-up apparatus 2 includes a base 4 that supports the respective constituent elements configuring the pick-up apparatus 2, and each element is controlled by a controller 1 including a processing device and a storing device, for example. The processing device of the controller 1 is typically a central processing unit (CPU) and executes various kinds of processing necessary for controlling the above-described respective elements. The storing device of the controller 1 includes a main storing device such as a dynamic random access memory (DRAM) and an auxiliary storing device such as a hard disk drive or flash memory, for example. Functions of the controller 1 are implemented through operation of the processing device in accordance with a program stored in the storing device, for example.

As illustrated in FIG. 1, a cassette placement pedestal 5 is disposed at a corner part of the base 4 on one side and a cassette 5a is placed on the cassette placement pedestal 5. For example, plural wafer units 11 illustrated in FIG. 3 are housed in the cassette 5a.

Figure 3:
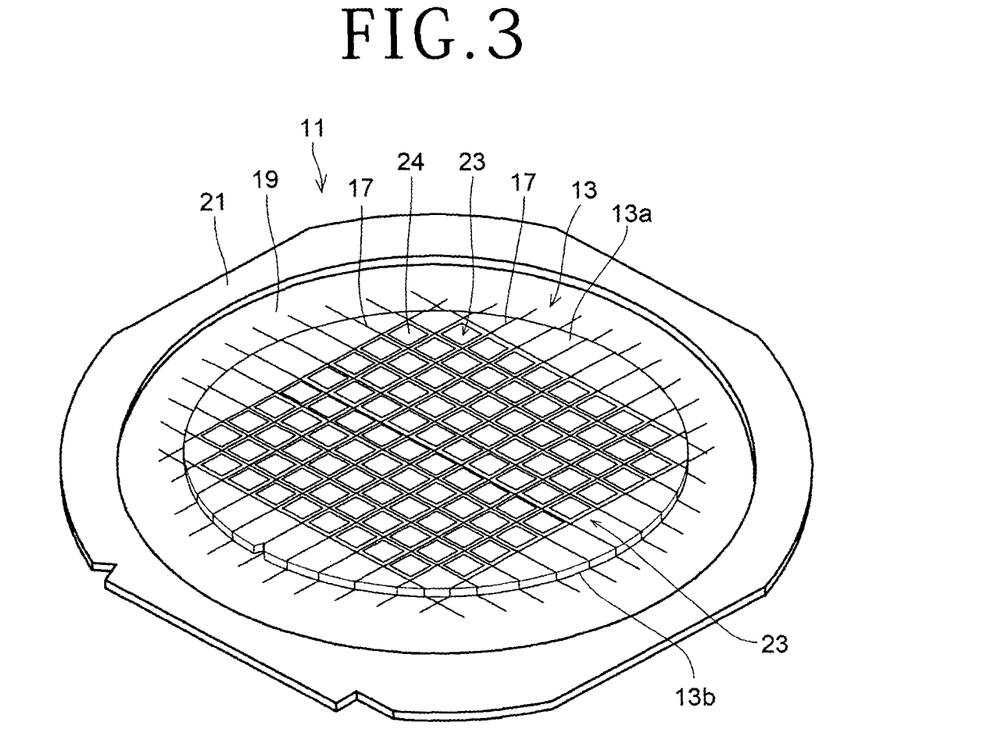
FIG. 3 is a diagram for explaining a configuration of a wafer unit.

As illustrated in FIG. 3, in the wafer unit 11, a back surface 13b of a wafer 13 is fixed to an annular frame 21 through a tape 19, and a front surface 13a of the wafer 13 is exposed. The wafer 13 is cut along planned dividing lines 17 that extend in directions orthogonal to each other by cutting processing or the like and is in a state in which it is diced into plural chips 23. Devices 24 are formed on front surface side of the respective chips 23.

For each chip 23, an identification number for identifying each chip 23 is set and is stored in the controller 1 (FIG. 1). This identification number is allocated through, for example, calculation of the number of chips from the wafer size input to the apparatus, the chip size, a taken image by a wafer imaging camera 60 (FIG. 1), and so forth, on the basis of, for example, a notch formed in the wafer. In association with this identification number, the flexural strength to be described later and so forth are stored in the controller 1 (FIG. 1). A test to measure the flexural strength to be described later may be executed on all chips or may be executed on some of the chips.

As illustrated in FIG. 1, the wafer unit 11 is pulled out while being clamped by a clamp 22a of a conveying mechanism 20 on one side and is temporarily placed on a temporary placement mechanism 10. Thereafter, the wafer unit 11 is conveyed to a frame holding mechanism 14 by a clamp 22b of the conveying mechanism 20 on the other side. The frame holding mechanism 14 includes a frame support part 16 that is disposed on the lower side and vertically moves and a frame holding-down part 18 on the upper side, and the annular frame 21 of the wafer unit 11 is clamped between the frame support part 16 and the frame holding-down part 18 and is fixed. A cutout part 18a for allowing passing of the conveying mechanism 20 is made in the frame holding-down part 18.

As illustrated in FIG. 1 and FIG. 2, the frame holding mechanism 14 is supported by a positioning mechanism 30 that controls a position of the frame holding mechanism 14. The positioning mechanism 30 includes an X-axis movement mechanism 32 that moves the frame holding mechanism 14 along an X-axis direction and a Y-axis movement mechanism 42 that moves the frame holding mechanism 14 along a Y-axis direction. The position of the frame holding mechanism 14 in the horizontal direction is controlled by these X-axis movement mechanism 32 and Y-axis movement mechanism 42.

The X-axis movement mechanism 32 has a pair of guide rails 34 disposed on the base 4 along the X-axis direction, a ball screw 36 disposed between the pair of guide rails 34 in parallel, and a pulse motor 38 disposed at one end part of the ball screw 36.

A moving block 40 is slidably disposed on the pair of guide rails 34. A nut part (not illustrated) is disposed on lower surface side (back surface side) of the moving block 40. This nut part is screwed to the ball screw 36, and the moving block 40 moves in the X-axis direction due to rotation of the ball screw 36 by the pulse motor 38.

The Y-axis movement mechanism 42 has a pair of guide rails 44 disposed on the moving block 40 along the Y-axis direction, a ball screw 46 disposed between the pair of guide rails 44 in parallel, and a pulse motor 48 disposed at one end part of the ball screw 46.

As illustrated in FIG. 1, the frame holding mechanism 14 is slidably disposed over the pair of guide rails 44. A nut part (not illustrated) is disposed on a support part 14f of the frame holding mechanism 14. This nut part is screwed to the ball screw 46, and the frame holding mechanism 14 moves in the Y-axis direction due to rotation of the ball screw 46 by the pulse motor 48.

As illustrated in FIG. 1 and FIG. 2, the moving block 40 is configured into a plate shape, and an opening part 41 that penetrates in the upward-downward direction is formed at a position below the frame holding mechanism 14. Pushing-up from the lower side by a pushing-up mechanism 50 to be described later is enabled through this opening part 41.

A rectangular opening 4b is made in a region between the pair of guide rails 34 in the base 4. Inside this opening 4b, the pushing-up mechanism 50 that pushes up the chip 23 (FIG. 3) included in the wafer 13 of the wafer unit 11 from the lower surface side toward the upper side and has a circular cylindrical shape is disposed. The pushing-up mechanism 50 is connected to a raising-lowering mechanism (not illustrated) configured by a motor or the like and raises and lowers along a Z-axis direction.

When the frame holding mechanism 14 is moved along the X-axis direction by the positioning mechanism 30 in a state in which the annular frame 21 of the wafer unit 11 is fixed by the frame holding mechanism 14, the wafer unit 11 is positioned above the opening 4b.

Figure 4:
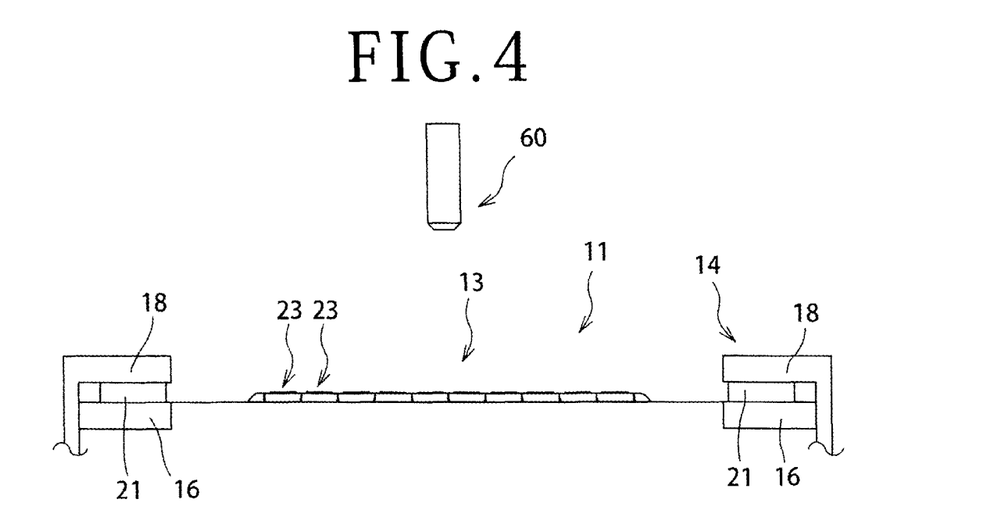
FIG. 4 is a diagram for explaining imaging of upper surfaces of chips by a wafer imaging camera.

As illustrated in FIG. 1, FIG. 2, and FIG. 4, on a path along which the frame holding mechanism 14 is moved to the upper side of the pushing-up mechanism 50, the wafer imaging camera 60 as imaging means that images an upper surface of the wafer 13 (FIG. 4) stuck to the annular frame 21 attached by the frame holding mechanism 14 is disposed.

As illustrated in FIG. 4, the upper surface of the wafer 13 is imaged by the wafer imaging camera 60, and the position of each chip 23 is acquired based on the taken image.

Figure 5:
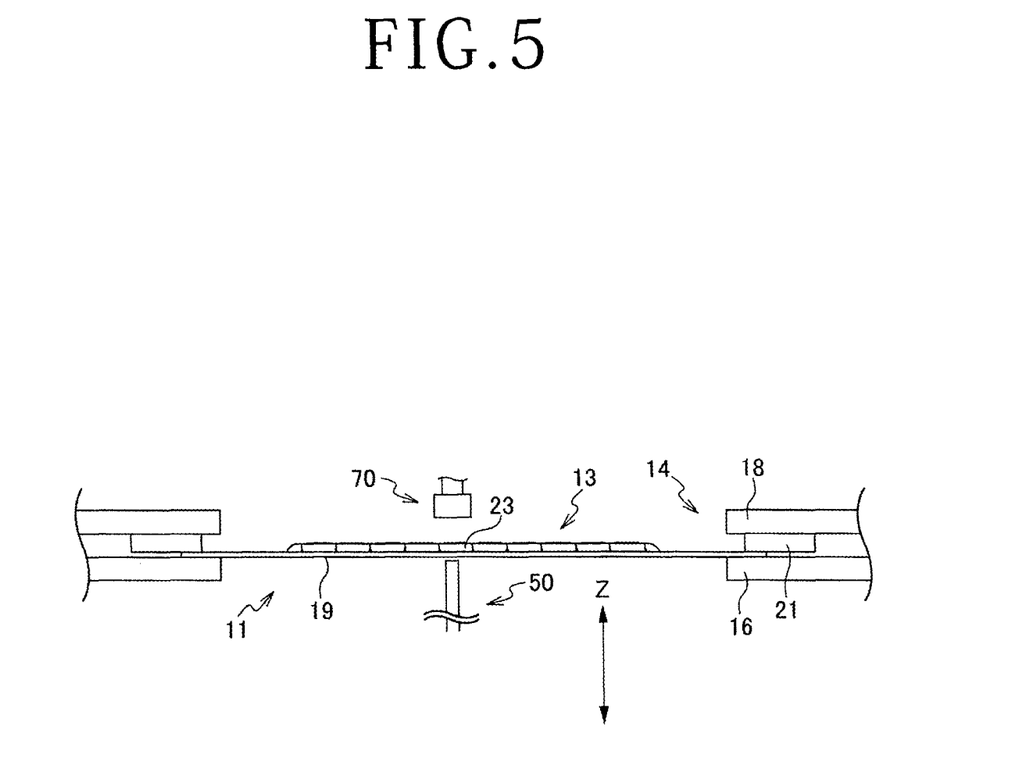
FIG. 5 is a diagram for explaining pushing-up of the chip by a pushing-up mechanism.

As illustrated in FIG. 1 and FIG. 2, position adjustment of the frame holding mechanism 14 positioned above the opening 4b is executed by the positioning mechanism 30 (FIG. 1, FIG. 2) in order to align the position of the chip 23 to be picked up with a position right above the pushing-up mechanism 50 as illustrated in FIG. 5.

FIG. 5 is a diagram illustrating the wafer unit 11 disposed above the pushing-up mechanism 50, and a predetermined chip 23 is pushed up by the pushing-up mechanism 50. The pushing-up mechanism 50 is configured to raise and lower in the Z-axis direction and has a suction part that is formed into a hollow circular column shape and configures an external layer part and a pushing-up part that is disposed inside the suction part and has a quadrangular prism shape. While sucking a lower surface of the tape 19 by the suction part, the pushing-up mechanism 50 pushes up the inside thereof by the pushing-up part. Thereby, the pushing-up mechanism 50 separates the chip 23 from an upper surface of the tape 19.

As illustrated in FIG. 5, a pick-up mechanism 70 is positioned above the pushing-up mechanism 50, and the pushed-up chip 23 is picked up.

As illustrated in FIG. 2, the pick-up mechanism 70 includes a chip holding implement 76 (collet) that can raise and lower in the Z-axis direction and can hold the pushed-up chip by suction adhesion and is connected to a chip holding implement movement mechanism 80 that moves the pick-up mechanism 70 in the Y-axis direction and the Z-axis direction.

As illustrated in FIG. 2, the chip holding implement 76 is disposed movably in the X-axis direction and the Z-axis direction at the tip of an arm 74 that extends in the horizontal direction. The rear end of the arm 74 is connected to the chip holding implement movement mechanism 80 through a moving base 72.

The pick-up mechanism 70 is connected to the chip holding implement movement mechanism 80. The chip holding implement movement mechanism 80 includes a Y-axis movement mechanism 82 that moves the pick-up mechanism 70 along the Y-axis direction and a Z-axis movement mechanism 92 that moves the pick-up mechanism 70 along the Z-axis direction. The position of the chip holding implement 76 in the Y-axis direction and the Z-axis direction is controlled by the Y-axis movement mechanism 82 and the Z-axis movement mechanism 92.

The Y-axis movement mechanism 82 includes a pair of guide rails 84 disposed along the Y-axis direction. A ball screw 86 is disposed between the pair of guide rails 84 in parallel, and a pulse motor 88 is coupled to one end part of the ball screw 86.

A moving block 90 is slidably mounted on the pair of guide rails 84. A nut part (not illustrated) of the moving block 90 is screwed to the ball screw 86, and the moving block 90 moves in the Y-axis direction due to rotation of the ball screw 86 by the pulse motor 88.

As illustrated in FIG. 2, the Z-axis movement mechanism 92 has a pair of guide rails 94 disposed along the Z-axis direction on a side surface of the moving block 90, a ball screw 96 disposed between the pair of guide rails 94 in parallel, and a pulse motor 98 disposed at one end part of the ball screw 96.

The moving base 72 of the pick-up mechanism 70 is slidably mounted on the pair of guide rails 94. A nut part (not illustrated) of the moving base 72 is screwed to the ball screw 96, and the moving base 72 moves in the Z-axis direction due to rotation of the ball screw 96 by the pulse motor 98.

By the pick-up mechanism 70 configured as above, the chip 23 pushed up by the pushing-up mechanism 50 is picked up. The identification number is set for this picked-up chip 23, and the flexural strength to be described later and so forth are stored in the controller 1 (FIG. 1) in association with this identification number.

For the picked-up chip, the back surface and the side surface thereof are observed by a chip observation mechanism 100 as illustrated in FIG. 1. The chip observation mechanism 100 includes a back surface observation mechanism 102 that observes the back surface of the chip and a side surface observation mechanism 112 that observes the side surface of the chip, and the back surface and the side surface of the chip are imaged by the respective observation mechanisms.

The chip observed by the chip observation mechanism 100 is housed in a chip housing tray 501 or is conveyed to the testing apparatus 200 as appropriate. In the testing apparatus 200, measurement of the flexural strength (bending strength) of the chip is executed.

Next, the configuration of the testing apparatus 200 illustrated in FIG. 6 will be described. The testing apparatus 200 mainly has a support unit 210 that supports the chip 23 that becomes a test piece, a pressing unit 226 including an indenter 204 that presses the chip 23 supported by the support unit 210, a drive unit 240 that raises and lowers the pressing unit 226, and a load measurement instrument 225 that measures the load acting on the indenter 204.

More detailed description will be made below. The support unit 210 includes a pair of support pedestals 213 that support the chip 23. The pair of support pedestals 213 are each configured into a rectangular parallelepiped shape, and a gap 217 is ensured between them.

A projecting support part 215 that protrudes upward is formed at each of places opposed to each other at the upper parts of the pair of support pedestals 213. Each support part 215 is formed into a straight line shape to extend in the Y-axis direction, and the chip 23 is supported from the lower side at each support part 215.

The upper end parts of the support parts 215 are formed into a curved surface shape and configure fulcrums that support the chip 23. Each support pedestal 213 is configured to move in the X-axis direction by a drive mechanism that is not illustrated in the diagram, and the distance between the fulcrums of the respective support parts 215 is adjusted.

The pressing unit 226 is disposed above the support unit 210. The pressing unit 226 presses the chip 23 that is supported by the support unit 210 and becomes a test piece, and measures the load applied to the indenter 204 of the pressing unit 226 at the time of pressing of the chip 23.

The pressing unit 226 includes a moving unit 228 raised and lowered in the upward-downward direction by the drive unit 240. A first support component 227 with a circular cylindrical shape is connected to the lower part of the moving unit 228, and the load measurement instrument 225 formed of a load cell or the like is fixed to the lower part of the first support component 227. The load measured with the load measurement instrument 225 is stored by the controller 1.

A clamping component 239 is connected to the lower part of the load measurement instrument 225 through a second support component 229 with a circular cylindrical shape. The clamping component 239 is formed into a substantially gate shape in front view, and the indenter 204 for pressing the chip 23 is fixed between a pair of clamping surfaces opposed to each other.

The indenter 204 is configured by a plate-shaped component having a predetermined width in the same direction as the Y-axis direction, in which the support parts 215 of the support unit 210 extend. The tip (lower end part) of the indenter 204 is formed into a tapered substantially V-shape in which the width in the X-axis direction becomes smaller toward the lower side. The tip of the indenter 204 is formed into a rounded shape (R shape). The shape of the indenter 204 is not particularly limited.

The drive unit 240 that moves the pressing unit 226 along the vertical direction (Z-axis direction, upward-downward direction) is disposed on a rear side (back surface side) of the pressing unit 226. The drive unit 240 includes a support structure 242 that configures a perpendicular surface, and a pair of guide rails 244 are fixed along the Z-axis direction at a predetermined interval on a front face side (front surface side) of the support structure 242.

A ball screw 246 is disposed between the pair of guide rails 244 in parallel to the pair of guide rails 244, and a pulse motor 248 is coupled to one end part of the ball screw 246.

A rear surface side of the moving unit 228 is slidably mounted on the pair of guide rails 244, and the rear surface side of the moving unit 228 is screwed to the ball screw 246 with the interposition of a coupling part that is not illustrated in the diagram.

When the ball screw 246 is rotated by the pulse motor 248, the moving unit 228 moves in the Z-axis direction along the guide rails 244, and the indenter 204 gets closer to and farther away from the support unit 210 relatively.

On the moving unit 228, a scale reading part 221 for reading the calibrations of a scale 222 and detecting the height position of the moving unit 228 in the Z-axis direction is disposed. The controller 1 can identify the position of the tip of the indenter 204 on the basis of the position of the scale reading part 221.

Figure 7:
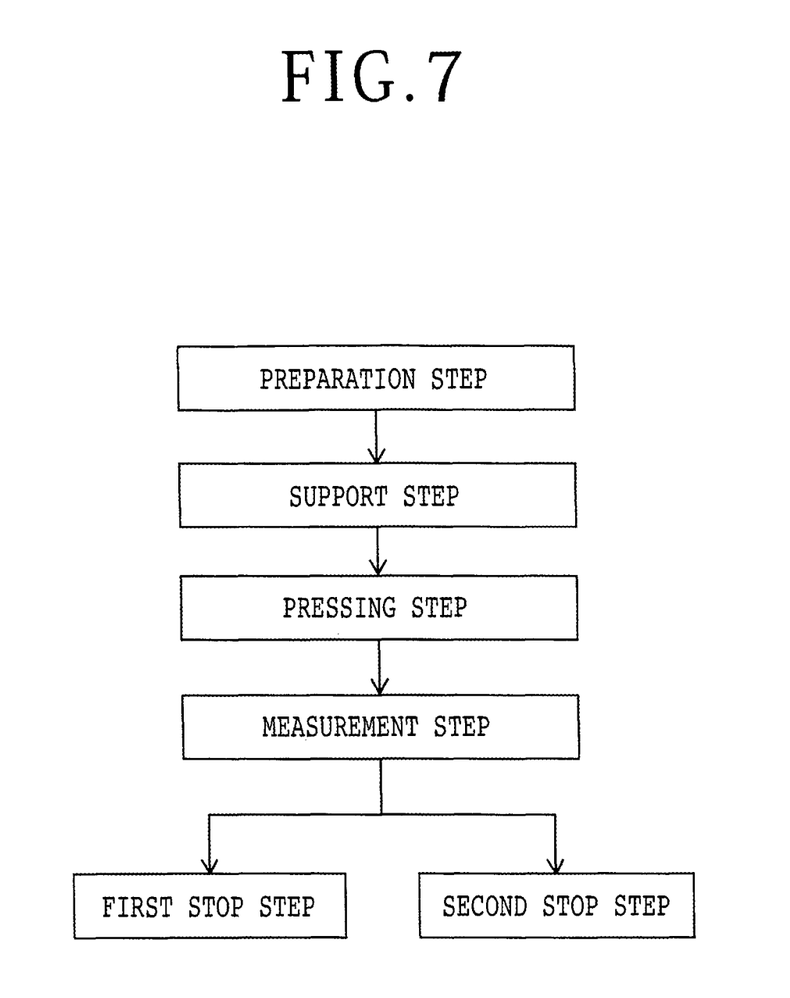
FIG. 7 is a flowchart illustrating respective steps of a testing method.

Next, a testing method by use of the above-described apparatus configuration will be described. FIG. 7 is a flowchart illustrating one example of the testing method, and the testing method will be described below in order of the respective steps illustrated in this flowchart.

<Preparation Step>

Figure 6:
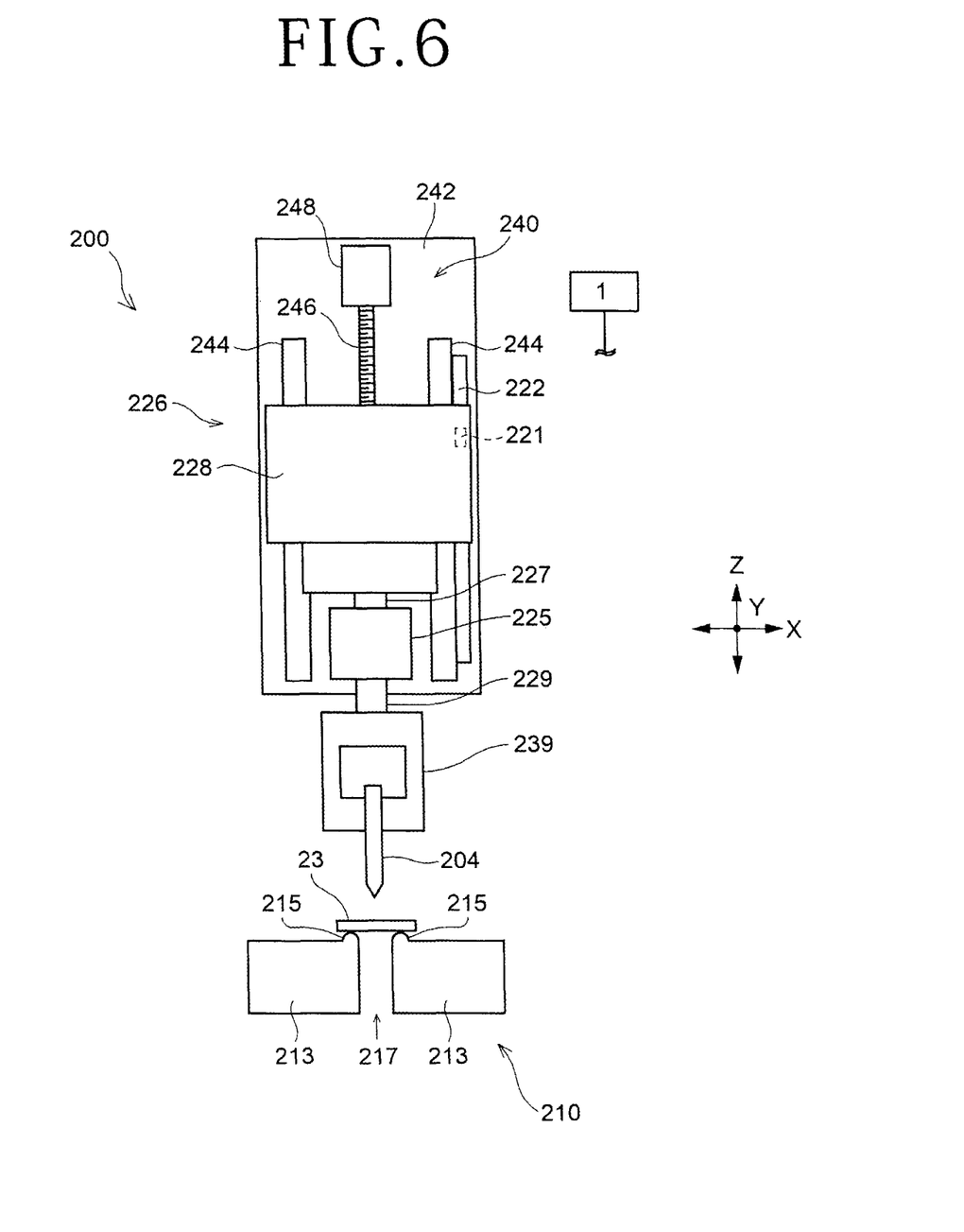
FIG. 6 is a diagram for explaining a configuration example of the testing apparatus.

As a preparation step, as illustrated in FIG. 6, the thickness of the chip 23 that is a test piece is stored in the controller 1 in advance. Also, position adjustment (setup) to specify the relative positional relation in the height direction between the tip of the indenter 204 and the apexes (upper ends) of the support parts 215 is executed.

Figure 10:
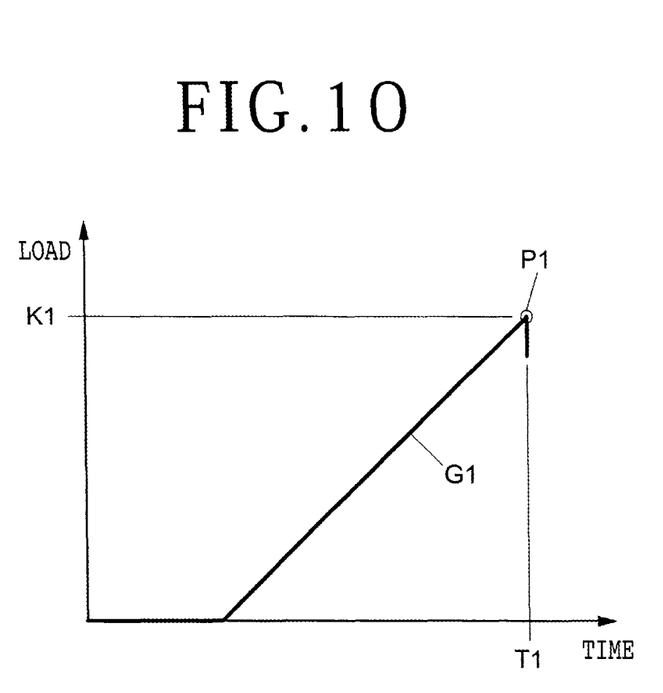
FIG. 10 is a graph illustrating a relation between time and a load measured by a load measurement instrument.
Figure 12:
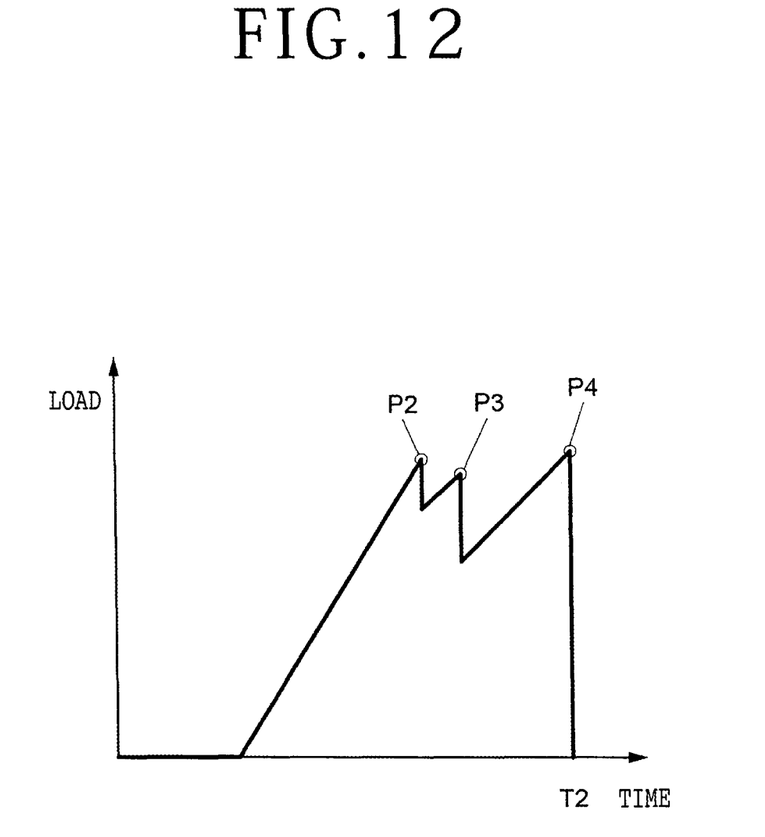
FIG. 12 is a graph illustrating a case in which second movement control is executed.

The controller 1 includes a timer for acquiring a graph illustrated in FIG. 10 or FIG. 12. Also, in the controller 1, a program to execute either one of first control including a first stop step to be described later and second control including a second stop step on the basis of setting (selection) by the operator is stored.

<Support Step>

Figure 8:
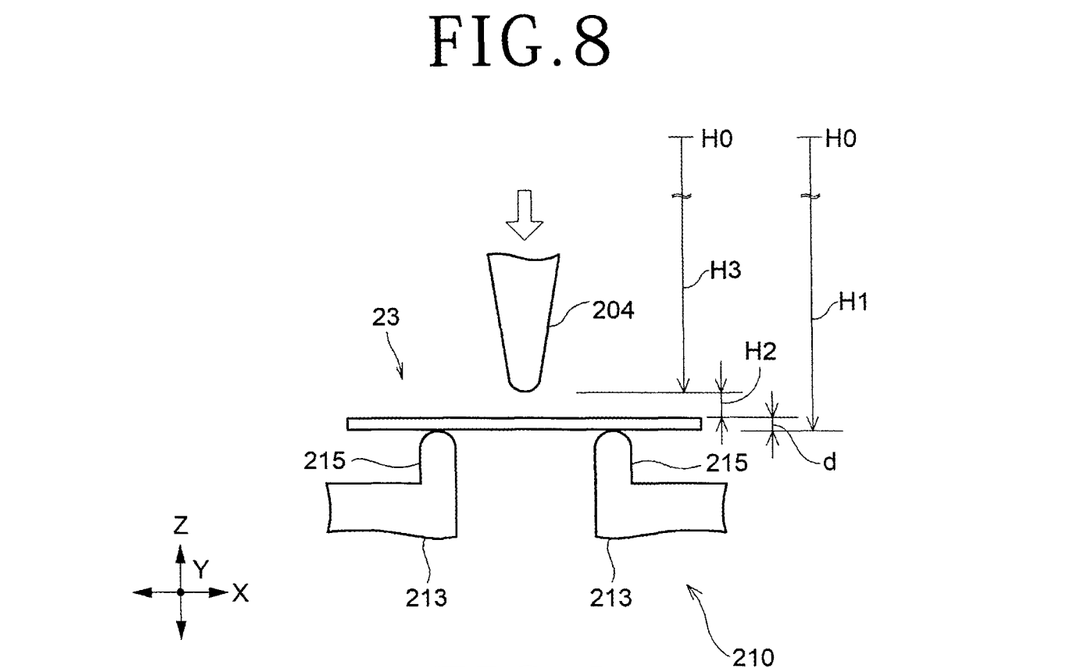
FIG. 8 is a diagram for explaining a support step.

As illustrated in FIG. 8, a support step is a step of supporting a lower surface side of the chip 23 by the support unit 210. The lower surface side of the chip 23 is supported by the pair of support parts 215 in the state illustrated in FIG. 8.

<Pressing Step>

Figure 9:
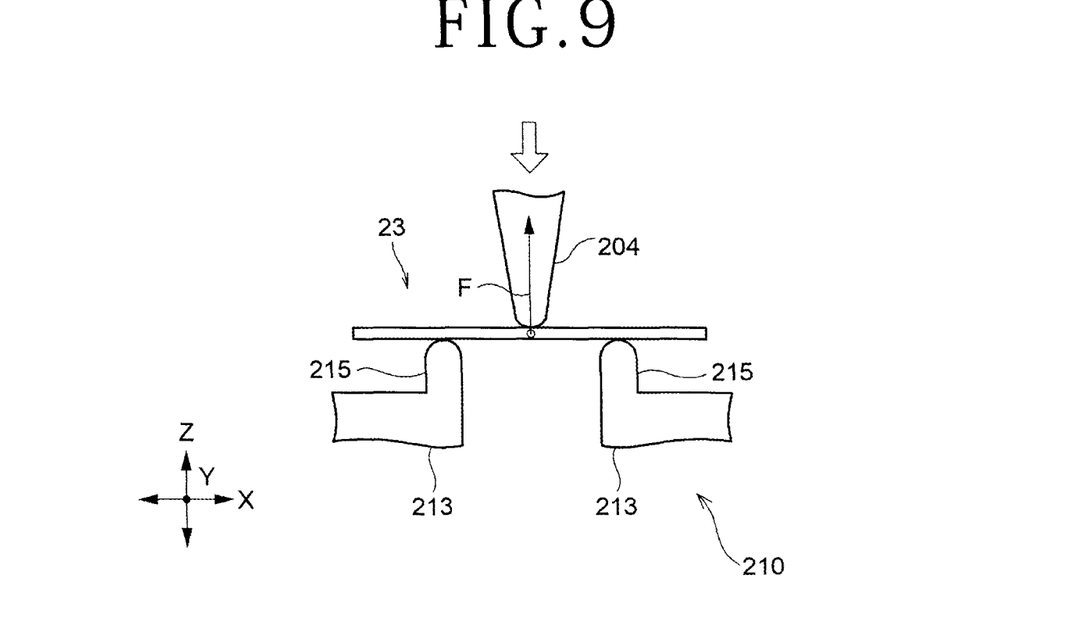
FIG. 9 is a diagram for explaining a pressing step.

As illustrated in FIG. 9, a pressing step is a step of pressing the chip 23 supported by the support unit 210 with the indenter 204.

Specifically, in the configuration of FIG. 6, the controller 1 drives the pulse motor 248 to lower the whole of the pressing unit 226. At this time, for example, as illustrated in FIG. 8, the pressing unit 226 moves at a lowering speed of 0.1 mm/s, for example, while the tip of the indenter 204 moves across a distance H3. The distance H3 is a distance obtained by subtracting a thickness d of the chip 23 and a margin distance H2 from a distance H1 from an origin position H0 of the indenter 204 to the upper ends of the support parts 215 of the support unit 210.

After the indenter 204 reaches the height position that is at the distance H3 from the origin position H0, the controller 1 lowers the pressing unit 226 at a slower lowering speed of 10 μm/s, for example, and causes the tip of the indenter 204 to reach the chip 23. Here, the controller 1 lowers the pressing unit 226 at the comparatively faster lowering speed until the speed is changed at the height position at the distance H3 from the origin position H0, that is, until the tip of the indenter 204 has moved across the distance H3. Due to this, the throughput of the test can improve. However, the controller 1 may lower the pressing unit 226 at the comparatively slower lowering speed of 10 μm/s from the origin position H0.

<Measurement Step>

As illustrated in FIG. 9, a measurement step is a step of measuring the load of pressing by the indenter 204 with the load measurement instrument 225 in conjunction with the start of the pressing step.

As illustrated in FIG. 9, when the tip of the indenter 204 reaches the chip 23, the indenter 204 receives a reaction force F generated in the chip 23, and a load acts on the indenter 204. This load is measured with the load measurement instrument 225 (FIG. 6), and data like a change line G1 illustrated in FIG. 10 is acquired. In the graph of FIG. 10, the abscissa axis indicates the time, and the ordinate axis indicates the load measured with the load measurement instrument 225. The controller 1 acquires the load every 5 ms, for example, and stores the load.

<First Stop Step>

A first stop step is a step of stopping the movement of the indenter 204 when the measurement value of the load measurement instrument 225 has turned from a rise to a fall in the measurement step (first control).

The graph of FIG. 10 illustrates a case in which a change point P1 at which the measurement value of the load measurement instrument 225 turns from a rise to a fall appears at a time T1. When detecting such a change in the measurement value, the controller 1 (FIG. 6) stops the movement of the indenter 204.

Figure 11:
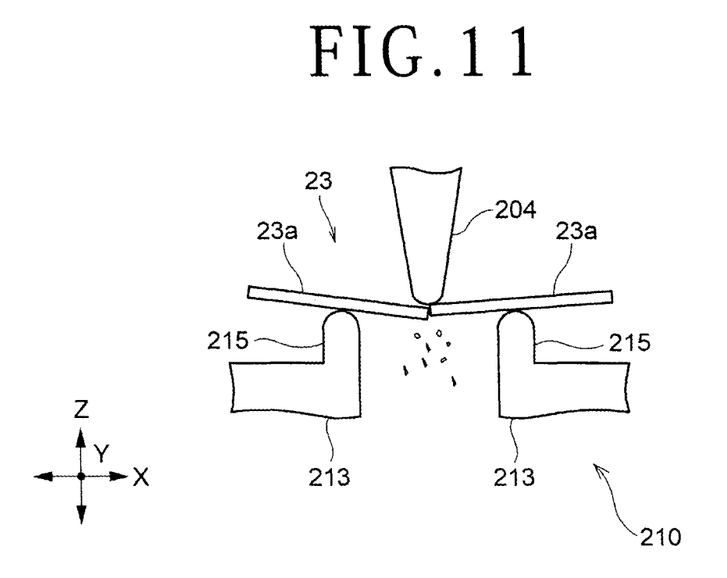
FIG. 11 is a diagram illustrating a situation in which the chip is completely divided and a measurement value of the load measurement instrument becomes zero.

As above, when the measurement value of the load measurement instrument 225 has turned from a rise to a fall (change point P1), the controller 1 deems that breakage of the chip 23 has occurred, and stops the movement of the indenter 204 (first stop step). This breakage includes a case in which the chip 23 completely splits into plural fragments 23a as illustrated in FIG. 11 besides a case in which one layer or plural layers break in a layer-stacking structure that configures the chip 23.

Moreover, in this case, when the load applied to the indenter 204 lowers, immediately the movement of the indenter 204 can be stopped. Therefore, the measurement time can be shortened.

Moreover, it is deemed that what is generally called initial fracture occurs when this measurement value of the load measurement instrument 225 turns from a rise to a fall, and the flexural strength (flexural strength according to three-point bending of SEMI standard G86-0303) can be calculated based on the measurement value when this initial fracture occurs. This flexural strength is used when a processing condition of back surface grinding of the wafer is set, for example.

The flexural strength is obtained by calculating a bending stress value σ. Specifically, the bending stress value σ is $3WL/2bh^2$ when the maximum value of the load applied to the indenter 204 is defined as W [N], the distance between the upper ends of the pair of support parts 215 is defined as L [mm], the width of the chip 23 (length of the chip 23 in the direction perpendicular to a straight line that links the pair of support parts 215 (Y-axis direction)) is defined as b [mm], and the thickness of the chip 23 is defined as h [mm].

Moreover, the following way may be employed. The controller 1 acquires the load every 5 ms, for example, and employs a load K1 at the certain measurement time T1 as a criterion. Then, when the amount of lowering from the load K1 regarding a load Kx at the time of subsequent measurement is larger than a predetermined value Ka, the controller 1 deems that breakage of the chip 23 has occurred, and stops the movement of the indenter 204. Due to this, the lowering of the indenter is not stopped and the measurement is continued when the load has slightly lowered, and the measurement can be continued until significant breakage occurs, for example. The predetermined value Ka is, for example, 5% to 10% of the load K1, or the like, and can be optionally set by the operator.

<Second Stop Step>

This second stop step (second control) is a step executed instead of the first stop step (first control) through selection by the operator and enables storing of behavior until the chip is completely divided and the load becomes zero.

Specifically, the controller 1 continues the movement of the indenter 204 also after the measurement value of the load measurement instrument 225 has turned from a rise to a fall in the measurement step, and stops the movement of the indenter 204 when the chip 23 is completely divided as illustrated in FIG. 11 and the measurement value of the load measurement instrument 225 has become zero.

In this case, as illustrated in the graph of FIG. 12, a change point P4 appears at a time T2, and the chip completely fractures, and the load applied to the indenter 204 becomes zero. Moreover, due to lowering of the indenter 204 until the time T2 at which the change point P4 occurs, the respective change points P2 and P3 before reaching to the change point P4 can be recorded, and analyzing the behavior until the chip completely fractures is enabled.

The change points P2 and P3 prominently appear when a device is formed on the chip. Thus, the second control can be employed particularly favorably in the case of measuring the flexural strength when a device is formed on the chip.

Moreover, due to the execution of the second stop step, when the load applied to the indenter 204 becomes zero, immediately the movement of the indenter 204 can be stopped, and the test can be ended. Thus, shortening of the measurement time is intended.

As described above, based on the first control illustrated in FIG. 10, it is deemed that breakage has occurred in the test piece, and movement of the indenter is stopped when the measurement value of the load measurement instrument has turned from a rise to a fall in the movement of the indenter. This can minimize the movement of the indenter and shorten the measurement time. Moreover, by moving the indenter until the measurement value of the load measurement instrument turns from a rise to a fall, the possibility that it is impossible to break the test piece due to insufficiency of the movement of the indenter can be prevented.

Moreover, by executing the second control illustrated in FIG. 12 instead of the first control, storing the behavior until the test piece is completely divided and the load becomes zero is enabled. Further, also in the case of the second control, the measurement can be ended halfway without moving the indenter across a distance made to have a sufficient margin in order to surely break the test piece. Therefore, shortening of the measurement time can be intended.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A testing apparatus comprising:
   a support unit that supports a lower surface side of a test piece;
   a pressing unit having an indenter that presses the test piece supported by the support unit;
   a drive mechanism that raises and lowers the pressing unit;
   a load measurement instrument that measures a load generated when the indenter presses the test piece supported by the support unit; and
   a controller that controls raising and lowering of the pressing unit,
   wherein the controller is configured to be capable of stopping movement of the indenter when both a measurement value of the load measurement instrument has turned from a rise to a fall after the indenter has started pressing of the test piece and a subsequent measurement value of the load measurement instrument, after the change from the rise to the fall, shows a reduction in the load that is greater than a predetermined value.

2. The testing apparatus according to claim 1, wherein the controller stores a program that executes, based on selection by an operator, either one of:
   first control to stop the movement of the indenter when both the measurement value of the load measurement instrument has turned from a rise to a fall after the indenter has started the pressing of the test piece and a subsequent measurement value of the load measurement instrument, after the change from the rise to the fall, shows a reduction in the load that is greater than a predetermined value, and
   second control to stop the movement of the indenter when the measurement value of the load measurement instrument has become zero after the indenter has started the pressing of the test piece.

3. The testing apparatus according to claim 1, wherein:
   the measurement value when turning from the rise to the fall is defined as K1;
   the predetermined measurement value is defined as Ka; and
   Ka equals b×K1, where b is a value selected between 0.05 and 0.10.

4. The testing apparatus according to claim 1, wherein:
the measurement value when turning from the rise to the fall is defined as K1;
the predetermined measurement value is defined as Ka; and
Ka equals b×K1, where b is 0.05.

5. The testing apparatus according to claim 1, wherein:
the measurement value when turning from the rise to the fall is defined as K1;
the predetermined measurement value is defined as Ka; and
Ka equals b×K1, where b is a 0.10.

6. A testing method comprising:
providing a controller that includes a program to execute both a first stop step and a second stop step;
a selecting step of selecting, by the operator, either the first stop step or the second stop step;
a support step of supporting a lower surface side of a test piece by a support unit;
a pressing step of pressing the test piece supported by the support unit with an indenter; and
a measurement step of measuring a load of pressing by the indenter with a load measurement instrument in conjunction with start of the pressing step; and
wherein the first stop step comprises stopping movement of the indenter when a measurement value of the load measurement instrument has turned from a rise to a fall in the measurement step, and
wherein the second stop step comprises stopping movement of the indenter when the measurement value of the load measurement instrument has become zero through continuing the movement of the indenter after the measurement value of the load measurement instrument has turned from a rise to a fall in the measurement step.

7. A testing apparatus comprising:
a support unit that supports a lower surface side of a test piece;
a pressing unit having an indenter that presses the test piece supported by the support unit;
a drive mechanism that raises and lowers the pressing unit;
a load measurement instrument that measures a load generated when the indenter presses the test piece supported by the support unit; and
a controller that controls raising and lowering of the pressing unit,
wherein the controller stores a program that includes both of the following:
first control to stop the movement of the indenter when the measurement value of the load measurement instrument has turned from a rise to a fall after the indenter has started the pressing of the test piece, and
second control to stop the movement of the indenter when the measurement value of the load measurement instrument has become zero after the indenter has started the pressing of the test piece, and
wherein the controller is configured and arranged to execute:
said first control when an operator makes a first selection that directs the controller to perform said first control; and
said second control when an operator makes a second selection that directs the controller to perform said second control.

* * * * *